UNITED STATES PATENT OFFICE.

EDWIN CUNO KAYSER, OF CINCINNATI, OHIO, ASSIGNOR TO THE PROCTER & GAMBLE COMPANY, OF CINCINNATI, OHIO, A CORPORATION OF OHIO.

PROCESS OF MAKING METALLIC CATALYZERS.

1,004,034.   Specification of Letters Patent.   Patented Sept. 26, 1911.

No Drawing.   Application filed January 10, 1908. Serial No. 410,086.

*To all whom it may concern:*

Be it known that I, EDWIN CUNO KAYSER, a citizen of Great Britain, now residing at Cincinnati, in the county of Hamilton and State of Ohio, have invented certain new and useful Improvements in Metallic Catalyzers and Methods of Preparing the Same, of which the following is a specification.

Following the observations of Sabatier, Senderens and others, finely divided metals, exercising catalytic action and accordingly described as "catalyzers" have of late been occasionally employed to induce chemical reactions, whereof many can not be brought about by any other means. For instance, it is known that by intervention of such catalyzers unsaturated fatty acids or their glycerids may be made to absorb gaseous hydrogen, whereby they become converted into the corresponding saturated compounds and thus hardened.

There are various known ways for producing metallic powders in a state of fine division. Nickel-powder, which for many purposes is recognized as the most potent catalyzer technically available, is, for example, most conveniently produced by acting upon such nickel compounds as the chlorid, oxid, hydrate or carbonate at an adequate temperature with a reducing gas, like hydrogen. The catalytic energy of such a powder, however carefully prepared, is at best an uncertain quantity; frequently it is feeble, and sometimes, for no conclusive reason, it is altogether lacking. Furthermore, powder thus produced is specifically heavy and not easily kept in suspension in a liquid medium like oil, when that is desired, nor can it, since it forms an almost impervious sediment, be readily separated and recovered from such liquid medium by a contrivance like the filter-press. The same objections apply to nickel-powder prepared by other means. Altogether, the difficulties of preparing reliable catalyzers, and nickel catalyzers in particular, are well recognized and have largely prevented such catalyzers from gaining industrial importance.

Now, the object of my invention is to provide a method for producing catalyzers of a reliable and uniform degree of activity and, in proportion to the quantity of metal employed, of higher efficiency than the best metallic catalyzers hitherto obtained, and to produce on an industrial scale metalliferous substances, possessing these qualities, convenient and economical for and in use, and which can be dealt with as an article of commerce.

I have discovered that by bringing suitable soluble or insoluble compounds of nickel, such as the nitrate, oxid, hydrate or carbonate, in an appropriate manner, into intimate combination with an inert, absorptive and comparatively bulky mineral substance, such as kieselguhr—infusorial earth—drying and comminuting the product, and reducing the powder thus produced, highly efficient and reliable catalyzers may at all times be produced. These catalyzers have moreover a comparatively low specific gravity, so that they can at will be kept readily suspended in a liquid medium such as oil; they also possess the great technical advantage of forming an excellent filter-bed, and may in consequence be rapidly and completely recovered from the oil or other liquid, wherein they may have been suspended during use, by means of the filterpress.

One specific method of carrying out my invention is, to permeate or saturate kieselguhr or other inert, absorptive, refractory material with a solution of nickel-nitrate, dry the mixture, employing in the case of the nitrate sufficient heat to expel the nitric acid, grind or otherwise comminute the resulting product, and reduce with hydrogen.

Another method is, to permeate or saturate kieselguhr or other inert, absorptive, refractory material with a solution of nickel-chlorid, nickel-sulfate or other soluble nickel-salt, enter the resulting product, with or without previous drying, into a boiling solution of carbonate or hydrate of soda or other suitable precipitant, remove the soluble salts, formed by washing, dry and comminute the residue, and reduce it as before.

A third and preferred method is, to permeate or saturate the kieselguhr or other inert, absorptive, refractory material with a solution of nickel-chlorid, nickel-sulfate or other nickel-salt, using so much solution only as will leave the kieselguhr in an apparently dry and freely workable condition, incorporate a molecular proportion of powdered carbonate of soda or other suitable powdered precipitant, throw the mixture with constant stirring into boiling water, remove the soluble salts formed by washing, dry and comminute the mixture, and reduce as before.

To develop the highest catalytic efficiency, the kieselguhr should become evenly and completely coated and permeated—plated with a film of metal. Above and below this point of complete and even metallization beneficial results may still be secured, but the full benefit of my process and the economy derived therefrom will not be realized.

I do not limit myself to any particular proportion as between nickel and kieselguhr, the less so as there are on the market many varieties of kieselguhr of diverse specific gravity and absorptive power and as the ultimate object of the catalyzer may have to be taken into account. A catalyzer, composed of one to two parts by weight of metallic nickel and four parts by weight of kieselguhr has however proved very effective in saturating fats and oils by means of hydrogen.

I claim as my invention:

1. The method of preparing a catalyzer, consisting in diffusing a solution of a reducible nickel-oxygen-salt over and through kieselguhr, drying and comminuting the product, and reducing the powder with hydrogen.

2. The method of producing a catalyzer, consisting in precipitating a reducible, insoluble nickel compound within and upon an inert, absorptive and comparatively bulky mineral substance; removing the soluble salts formed during precipitation by washing; then drying the product; and reducing the powder with hydrogen.

3. The method of producing a catalyzer, consisting in precipitating a reducible, insoluble nickel compound within and upon an inert, absorptive and comparatively bulky mineral substance; removing the soluble salts formed during precipitation by washing; then drying and comminuting the product; and reducing the powder with hydrogen.

4. The method of producing a catalyzer, consisting in precipitating an insoluble, reducible nickel compound within and upon kieselguhr; removing the soluble salts formed during precipitation by washing; drying and comminuting the product; and reducing the powder with hydrogen.

5. The method of preparing a metalliferous catalyzer, which consists in converting by a process of precipitation a soluble nickel-salt, intimately incorporated with a refractory inert material, into an insoluble compound, removing all soluble products of reaction, drying and comminuting the residue and submitting it to the reducing action of hydrogen.

6. The method of preparing a metalliferous catalyzer, which consists in permeating a refractory inert material with an absorbable proportion of an aqueous solution of a nickel-salt, then incorporating therewith a molecular proportion of a dry pulverous precipitant, then boiling the mixture with water and removing all soluble products formed, drying and comminuting the residue and submitting it to the reducing action of hydrogen.

7. The method of preparing a metalliferous catalyzer, which consists in boiling a refractory inert material permeated with a water-soluble nickel-salt in water containing a nickel-precipitant, removing all soluble products of reaction, drying and comminuting the residue and submitting it to the reducing action of hydrogen.

EDWIN CUNO KAYSER.

Witnesses:
E. La Cour,
W. W. Symmes.